United States Patent
Davalos et al.

(10) Patent No.: US 8,727,221 B1
(45) Date of Patent: May 20, 2014

(54) COLOR MICRO BAR CODE MARKER AND SYSTEM

(71) Applicants: Pedro Davalos, Plymouth, MN (US); Kwong Wing Au, Bloomington, MN (US); Sharath Venkatesha, Golden Valley, MN (US); Mahesh K. Gellaboina, Andhra Pradesh (IN)

(72) Inventors: Pedro Davalos, Plymouth, MN (US); Kwong Wing Au, Bloomington, MN (US); Sharath Venkatesha, Golden Valley, MN (US); Mahesh K. Gellaboina, Andhra Pradesh (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/682,291

(22) Filed: Nov. 20, 2012

(51) Int. Cl.
*G06K 7/00* (2006.01)
*G06K 19/08* (2006.01)
*G06K 7/10* (2006.01)
*G06K 7/14* (2006.01)
*G06K 19/06* (2006.01)
*G09F 3/00* (2006.01)

(52) U.S. Cl.
USPC ............. 235/462.04; 235/454; 235/462.01; 235/494; 40/301

(58) Field of Classification Search
CPC ............. G06K 7/14; G06K 7/10594; G06K 2019/06225; G06K 19/06037; G06K 10/10722; G06K 7/1417; G06K 7/10544; G06K 7/1413; G06K 7/1443; G02B 26/10; A01K 11/001; A01K 11/006
USPC ............ 235/462.01, 462.04, 494, 454, 62.01; 40/301
See application file for complete search history.

(56) References Cited

U.S. PATENT DOCUMENTS

| | | | |
|---|---|---|---|
| 4,263,504 A * | 4/1981 | Thomas | 235/454 |
| 6,651,887 B1 | 11/2003 | Sehnert | |
| 7,210,631 B2 | 5/2007 | Sali et al | |
| 7,673,807 B2 | 3/2010 | Simske et al. | |
| 7,712,671 B2 | 5/2010 | Cattrone et al. | |
| 8,100,330 B2 * | 1/2012 | Bulan et al. | 235/462.04 |
| 2002/0028015 A1 * | 3/2002 | Tack-don et al. | 382/162 |
| 2002/0125330 A1 * | 9/2002 | Schuessler et al. | 235/494 |
| 2004/0182930 A1 * | 9/2004 | Nojiri | 235/462.04 |
| 2005/0011955 A1 * | 1/2005 | Saito | 235/462.04 |
| 2005/0150964 A1 * | 7/2005 | Lo | 235/494 |
| 2007/0278303 A1 * | 12/2007 | Cattrone | 235/462.1 |
| 2007/0289152 A1 * | 12/2007 | Zeng et al. | 33/293 |
| 2009/0122146 A1 * | 5/2009 | Zalewski et al. | 348/169 |
| 2010/0058629 A1 * | 3/2010 | Albee et al. | 40/301 |
| 2011/0303748 A1 * | 12/2011 | Lemma et al. | 235/454 |

OTHER PUBLICATIONS

Merriam-Webster's Definition of "Micro", retrieved from http://www.merriam-webster.com/micro on Jul. 12, 2013.*

* cited by examiner

*Primary Examiner* — Christle Marshall
*Assistant Examiner* — Claude J Brown
(74) *Attorney, Agent, or Firm* — Schwegman, Lundberg & Woessner, P.A.

(57) ABSTRACT

A micro marker is formed of geometric features having various colors to apply to an object. The micro marker includes a background having a first color, multiple localization features formed on the background having a second color, and multiple information encoding features, each information encoding feature having a color selected from multiple colors to represent digital values, the information encoding features being arranged proximate the localization features on the background.

19 Claims, 5 Drawing Sheets

COLOR MICRO BAR CODE MARKER AND SYSTEM

BACKGROUND

Barcodes have been used for many years to encode information attached to objects such as devices and items for sale. Barcodes are commonly decoded with a scanner in close proximity, such as in grocery stores. Barcodes become harder to localize, read, and decode as the relative size of the barcode marker becomes smaller compared to the area monitored by the scanner. This effect can lead to difficulties localizing and decoding small barcodes at far distances while using standard area imaging-based scanners.

SUMMARY

A Color Micro Bar Code Marker (C-U Code) is formed of visual geometric features having various colors as part of a system for marker localization and encoding. The C-U Code marker includes a background having a first color, multiple localization features formed on the background having a second color, and multiple information encoding features, each information encoding feature having a color selected from multiple colors to represent digital values, the information encoding features being arranged proximate the localization features on the background.

A method includes obtaining an image of an object having a C-U Code marker on the object visible in the image, recognizing a portion of the object utilizing image analytics, identifying the micro marker as a function of the recognized portion of the object, identifying localization features of the micro marker, and obtaining information from the information encoding features between the localization features.

A device has a unit to capture or input an image and a processor to perform a method. The method includes determining a location of a micro marker from an image containing the micro marker based on a background of the marker and localization features, identifying information encoding quadrilaterals centered on a center line between the localization features, obtaining color information from each of the information encoding quadrilaterals, and determining a digital value for the micro marker as a function of the color information.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A color coded micro marker barcode system addresses a need for applications where a relatively small barcode needs to be scanned from long distances, applications when barcodes need to be placed on products in an unobtrusive fashion, or for applications where high quality or high resolution sensors are not available, and the amount of information required for encoding by the application is small such as single byte encoding. Previously there was no barcode system, no symbology marker standard, and no fiducial or reference definition that was able to meet this need for a low resolution micro barcode from long distances with low quality sensors.

A barcode reader is able to localize and decode information contained in the color coded micro marker barcode. In some embodiments, barcode readers are able to localize and decode micro barcodes consisting of only a few hundred pixels within a large image of over 2 million pixels. This task is equivalent of finding a needle in a haystack and reading text printed on the needle.

Embodiments of the color coded micro marker barcode system address the problem of embedding small information content in a concealed marker that can be decoded from long distances.

Figure 1:
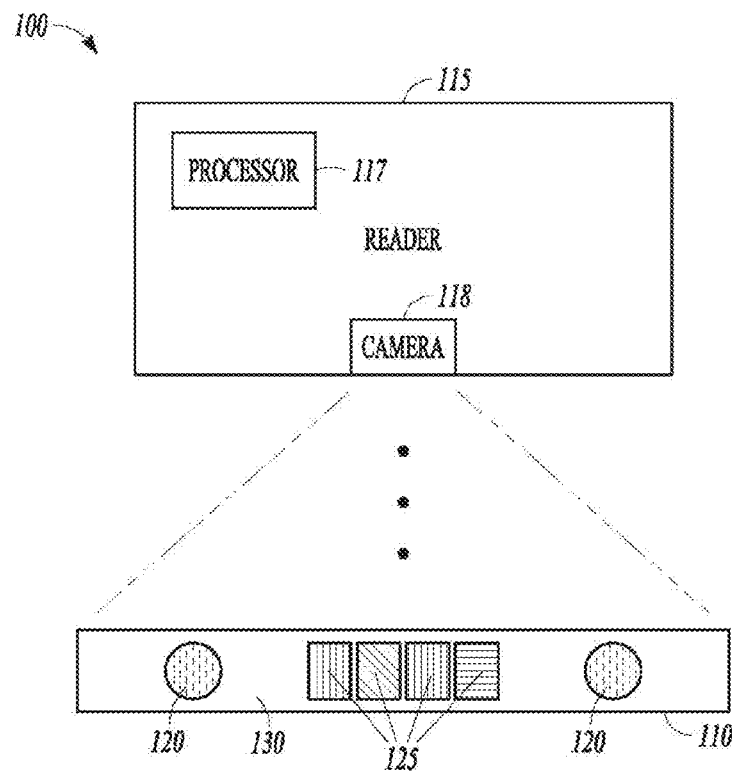
FIG. 1 is a block diagram of a micro marker barcode system according to an example embodiment.

FIG. 1 is a block diagram of a micro marker system 100. A marker is shown at 110 and a reader is shown at 115. The reader may include a processor 117 coupled to a camera 118. There are two main components in the micro marker 110. Localization features 120 are located near corners of the marker 110. Information encoding features 125 are positioned proximate the localization features 120, such as between a pair of localization features, but near enough to the features such that they can be located and decoded. The system 100 is fully expandable to support variations with higher information content.

In one embodiment, the marker 110 is composed of black background 130 in a rectangular shape. Localization features 120 include two color filled dots at the ends of the marker surrounded by black areas to provide for localization. The background may also be referred to as a localization feature, as it can help identify the marker 110 from an image of a larger object to which the marker may be attached. Information encoding features 125 include colored filled quadrilaterals between the localization dots.

Localization dots 120 serve as both the main landmarks for localizing and also as alignment reference markers. The marker localization problem can be constrained by establishing assumptions about marker placement and scene environment. In one embodiment, marker placement assumptions are that the marker is placed on an object that can be detected and localized independently of the micro marker, thus coupling the marker localization problem with localization of known larger objects. The reference dots may also be filled with color to assist localization.

Figure 2:
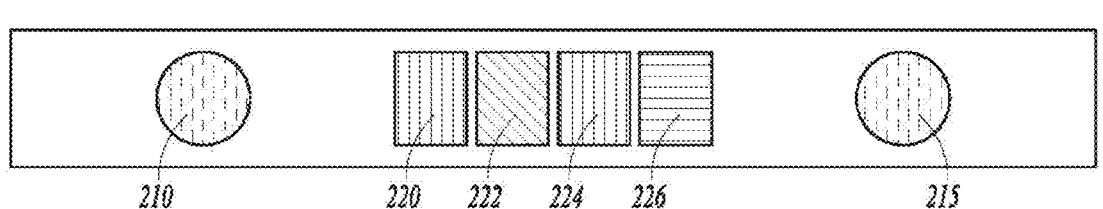
FIG. 2 is block schematic diagram of a micro marker barcode according to an example embodiment.

The micro marker information in one embodiment is encoded through color filled quadrilaterals between the reference dots, and various color combinations allow multiple message encodings. In one example, a marker 200 as shown in FIG. 2 contains two cyan reference dots 210 and 215 and four color filled quadrilaterals 220, 222, 224, and 226 of either red, green, or blue colors. This combination of three possible colors in four bins allows the encoding of 81 unique marker identifiers. However, variations in coded colors could include using only two colors, four colors, or more colors for encoding, allowing between 16 and 625 or more unique marker identifiers. Further marker symbology variations include using additional bins for coded colors, either in between the reference dots or anywhere surrounding the reference dots.

FIG. 2 also illustrates one particular example of relative sizes of various features of the marker 200. The dimensions are referred to with respect to arbitrary units of length. The actual size of each unit may be variable, making the marker inherently scalable in size, and may depend on the environment in which the marker will be used. In one embodiment, the marker is used in protective eyeglasses. The width of the marker may be selected to unobtrusively fit on a bridge between over the nose of the wearer, or on goggles. Such widths are generally $1/8^{th}$ to $1/10^{th}$ of an inch. The purpose of the marker may be to ensure that a person wears proper eyewear protection in a laboratory, and so should be detectable from a distance such as one meter or so by a fairly low resolution camera, such as a 1M pixel camera.

Once the overall size of the marker is selected for the particular application, the units shown in FIG. 2 may be used to create a marker in one embodiment. For instance, the reference dots 210 may have a diameter of 1 unit, with quadrilaterals 220, 222, 224, 226 having being 0.75 units on a side. The black background may have a width of 1.25 units, with approximately 0.25 units between edges of the dots and quadrilaterals, and the outside edge of the marker 200. The quadrilaterals are separated by $1/12^{th}$ of a unit, and the quadrilaterals are separated from the reference dots by 1.5 units, or about two quadrilaterals in width. The reference dots are also separated from the ends of the marker by the same distance. This is but one example, and the number of units for each different feature or the ratio of the size between different features may vary in further embodiments. For instance, further embodiments may vary the ratio of the colored quadrilaterals or the radius of the dots to the size of the background while maintaining the ability to detect and decode the marker from a desired distance.

In some embodiments, the marker may have a black area of 0.193 inches by 1.4 to 1.5 inches with a reference dot diameter of 0.125 inches.

In alternative embodiments, the reference dots may be another shape, such as any polygon or other shape that is susceptible to video analytic identification. Similarly, the quadrilaterals encoding the information may have different shapes in further embodiments. However, circular reference dots are advantageous in some embodiments due to the constraints of having a center and a radius, making them less likely to occur in a background image, and easier to identify a center to use in identifying the information encoded quadrilaterals. Similarly, quadrilaterals for information encoding provide the ability to easily detect the color from background clutter.

In various embodiments, different colors may be used for the reference dots and information quadrilaterals. In one embodiment, the reference dots are cyan. Yellow, magenta, and blue may be used for the information quadrilaterals in one embodiment. Detection may involve capturing an RGB image and then using a green channel and a blue channel to determine the digital information represented.

Figure 3:
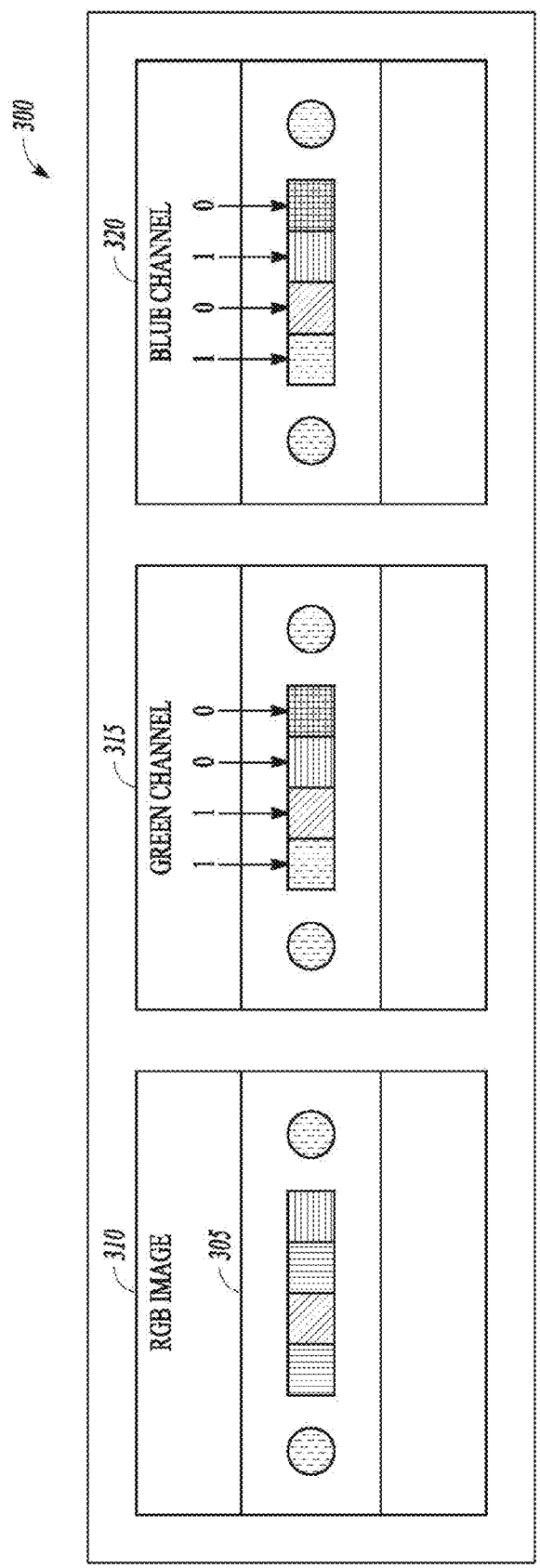
FIG. 3 is a block diagram of images of a micro marker barcode for processing according to an example embodiment.

Decoding of the information encoding feature in one embodiment is illustrated at 300 in FIG. 3, where an RGB image of a marker 305 is captured at 310. The RGB image 310 has a green channel at 315, and a blue channel at 320 and a red channel, which is not used in this embodiment. Orientation and locations of the reference features and geometric configuration of the information encoding features are used to localize the information encoding features. Then each colored quadrilateral is assigned a digital value for each channel as illustrated based on the intensity and a threshold. The information from the channels is then combined to determine the digital information contained in the marker. In this embodiment, the consecutive quadrilaterals in cyan, green, blue, and black, corresponding to the following values in Table 1.

TABLE 1

| Color | Green Channel | Blue Channel |
|---|---|---|
| Cyan | 1 | 1 |
| Green | 1 | 0 |
| Blue | 0 | 1 |
| Black | 0 | 0 |

Thus, the values shown in FIG. 3 are 11100100. The particular type of marker shown can represent up to 256 unique objects, or 128 types plus a parity bit in various embodiments. Other embodiments can use all or other combinations of red, green and blue channels to encode and decode the information features.

In another embodiment, the pair of localization features has different shapes and/or colors. One localization feature can be a yellow circle and the other localization feature can be a cyan star. The different shapes and colors of the localization features are used to indicate the start and end of the information encoding features. The start and end localization features ensure that the decoded information is combined in the correct order even when the marker is captured upside down in the image. For example, the decoded values of 300 in FIG. 3 could be erroneously interpreted as 00011011 if read from the right to left.

Figure 4:
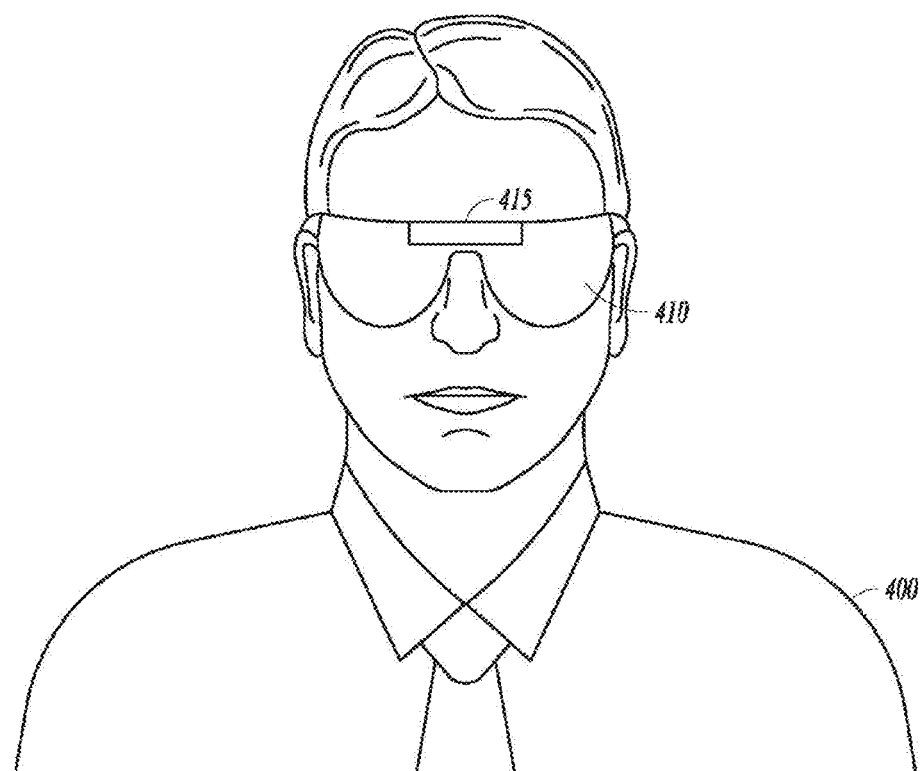
FIG. 4 is a block diagram of a person wearing glasses having a micro marker barcode according to an example embodiment.

FIG. 4 is a block diagram of a person 400 wearing a pair of goggles 410 having a micro marker bar code 415 shown in block form. An image of the person may be obtained from a distance that is too far to accurately read a common prior art bar code, unless the bar code is very large or the optics of the reader are sufficient to provide an image from which the code is easily recognizable. In one embodiment, with the micro code marker, an image of the person may be obtained and processed to recognize the face of the person. From there, it is much easier to recognize the micro marker code based on expected position of the marker given the recognized image of the face. The localization features of the micro marker code may then be used to localize the micro marker code and then obtain the information encoded in the code using the reference points to identify the location of the information quadrilaterals.

Figure 5:
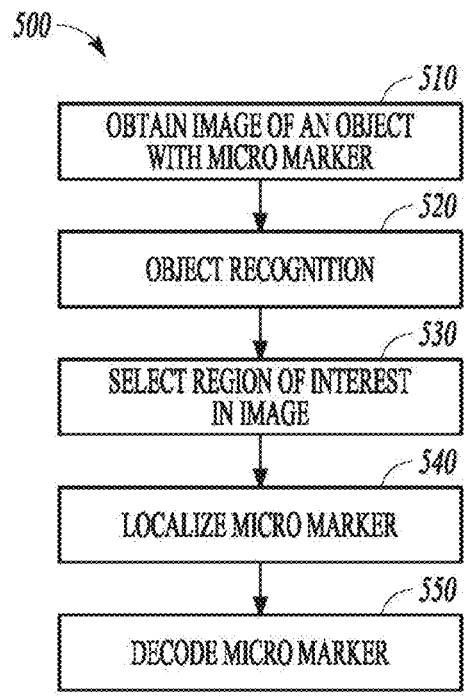
FIG. 5 is a flow diagram illustrating a method of finding and decoding a micro marker barcode in an image of an object according to an example embodiment.

FIG. 5 is a flow diagram illustrating a method 500 of finding and decoding a micro marker barcode in an image of an object according to an example embodiment. At 510, an image of an object having a micro marker on the object visible in the image is obtained. An object is recognized utilizing image analytics at 520. At 530, an identified sub-region of interest is selected as a function of the recognized object. The recognized object in one embodiment may be the face of a person. Many different products are available to identify faces in images. At 540, the locations of the localization features of the micro marker are identified. The identification and localization may be simplified by elimination of image pixels where the micro marker is not likely to be located, as can be derived from knowing the position of the recognized portion of the object. For instance, if one is looking for a code on eyewear, all pixels other than those in and around a recognized face portion of an image may be eliminated. Thus, the search for the background and localization features comprising the micro marker barcode is greatly simplified. At 550, information from the information encoding features between a pair of the localization features is decoded.

In some embodiments, identifying localization features includes recognizing a background of the micro marker and recognizing two circular localization features on either side of the information encoding features. The portion of the object may be a face, and the micro marker is positioned proximate the face. The localization features include circles in one embodiment having a selected color. The information encoding features in one embodiment are quadrilaterals, each having a color selected from multiple colors to represent digital values, the information encoding features being arranged between the pair of reference features on the background. In various embodiments, the square colors are selected from red, green, and blue. In further embodiments the square colors are selected from yellow, magenta, and blue. The quadrilaterals may be arranged centered on a line between centers of the circles and are equally spaced apart.

Figure 6:
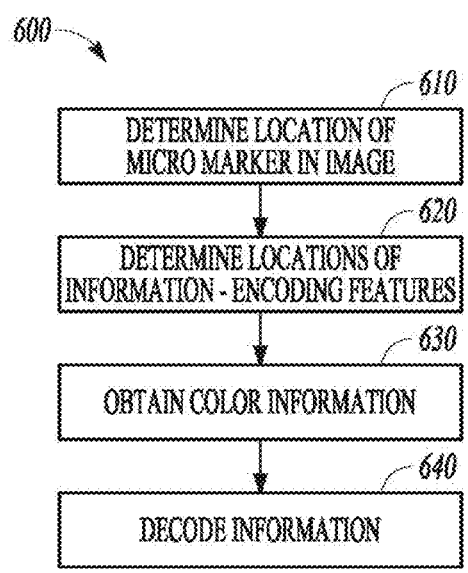
FIG. 6 is a flow diagram illustrating a method of decoding a micro marker barcode according to an example embodiment.

FIG. 6 is a flow diagram illustrating a method 600 of decoding a micro marker barcode according to an example embodiment. A computer readable storage device may have instructions for causing a computer to perform method 600. The method includes determining a location of a micro marker at 610 from an image containing the micro marker based on the localization features. At 620, the locations of the encoded features areis determined based on the localization features location. At 630, color information is obtained from each of the information encoding features. Finally at 640, a digital value for the micro marker is determined as a function of the color information.

In a further embodiment, determining a location of the micro marker includes identifying an object in the image proximate the micro marker and using the location of the identified object to determine a likely location of the micro marker.

Figure 7:
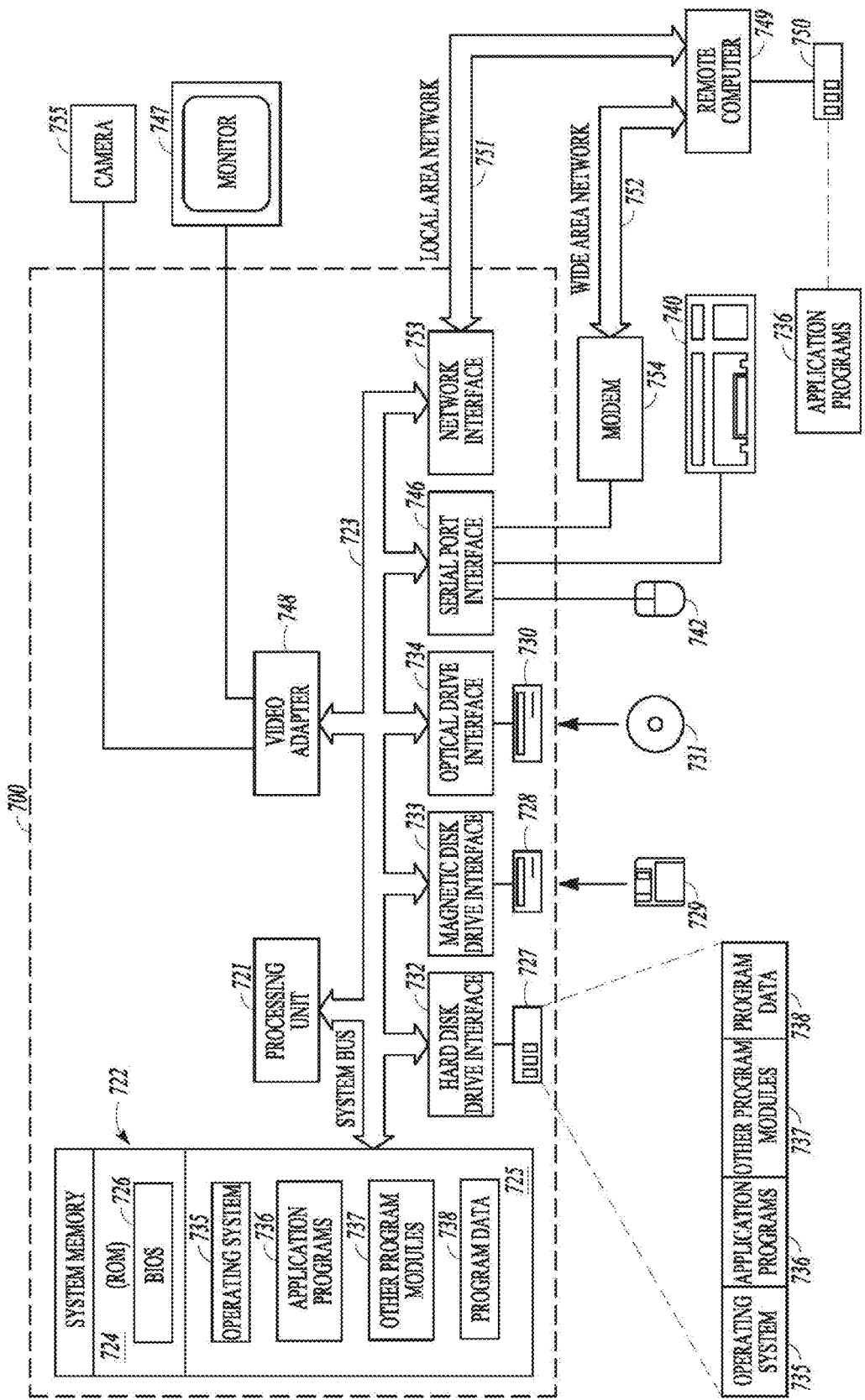
FIG. 7 is a block diagram of a computer system for executing one or more methods according to an example embodiment.

FIG. 7 is a block diagram of a computer system to implement methods according to an example embodiment. In the embodiment shown in FIG. 7, a hardware and operating environment is provided that may be used to form a micro marker barcode reader. Several components may be eliminated from the diagram in order to minimize expense, as many components may not be needed to obtain and process images containing micro marker barcodes.

As shown in FIG. 7, one embodiment of the hardware and operating environment includes a general purpose computing device in the form of a computer 700 (e.g., a personal computer, workstation, or server), including one or more processing units 721, a system memory 722, and a system bus 723 that operatively couples various system components including the system memory 722 to the processing unit 721. There may be only one or there may be more than one processing unit 721, such that the processor of computer 700 comprises a single central-processing unit (CPU), or a plurality of processing units, commonly referred to as a multiprocessor or parallel-processor environment. In various embodiments, computer 700 is a conventional computer, a distributed computer, or any other type of computer.

The system bus 723 can be any of several types of bus structures including a memory bus or memory controller, a peripheral bus, and a local bus using any of a variety of bus architectures. The system memory can also be referred to as simply the memory, and, in some embodiments, includes read-only memory (ROM) 724 and random-access memory (RAM) 725. A basic input/output system (BIOS) program 726, containing the basic routines that help to transfer information between elements within the computer 700, such as during start-up, may be stored in ROM 724. The computer 700 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media.

The hard disk drive 727, magnetic disk drive 728, and optical disk drive 730 couple with a hard disk drive interface 732, a magnetic disk drive interface 733, and an optical disk drive interface 734, respectively. The drives and their associated computer-readable media provide non volatile storage of computer-readable instructions, data structures, program modules and other data for the computer 700. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 729, optical disk 731, ROM 724, or RAM 725, including an operating system 735, one or more application programs 736, other program modules 737, and program data 738. Programming for implementing one or more processes or method described herein may be resident on any one or number of these computer-readable media.

A user may enter commands and information into computer 700 through input devices such as a keyboard 740 and pointing device 742. Other input devices (not shown) can include a microphone, joystick, game pad, satellite dish, scanner, or the like. These other input devices are often connected to the processing unit 721 through a serial port interface 746 that is coupled to the system bus 723, but can be connected by other interfaces, such as a parallel port, game port, or a universal serial bus (USB). A monitor 747 or other type of display device can also be connected to the system bus 723 via an interface, such as a video adapter 748. The monitor 747 can display a graphical user interface for the user. In addition to the monitor 747, computers typically include other peripheral output devices (not shown), such as speakers and printers. A camera 755 may also be coupled to the video adapter 748 or other adapter to provide images containing micro marker barcodes according to various embodiments described above.

The computer 700 may operate in a networked environment using logical connections to one or more remote computers or servers, such as remote computer 749. These logical connections are achieved by a communication device coupled to or a part of the computer 700; the invention is not limited to a particular type of communications device. The remote computer 749 can be another computer, a server, a router, a network PC, a client, a peer device or other common network node, and typically includes many or all of the elements described above I/0 relative to the computer 700, although only a memory storage device 750 has been illustrated. The logical connections depicted in FIG. 7 include a local area network (LAN) 751 and/or a wide area network (WAN) 752. Such networking environments are commonplace in office networks, enterprise-wide computer networks, intranets and the internet, which are all types of networks.

When used in a LAN-networking environment, the computer 700 is connected to the LAN 751 through a network interface or adapter 753, which is one type of communications device. In some embodiments, when used in a WAN-networking environment, the computer 700 typically includes a modem 754 (another type of communications device) or any other type of communications device, e.g., a wireless transceiver, for establishing communications over the wide-area network 752, such as the internet. The modem 754, which may be internal or external, is connected to the system bus 723 via the serial port interface 746. In a networked environment, program modules depicted relative to the computer 700 can be stored in the remote memory storage device 750 of remote computer, or server 749. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Examples

1. A micro marker formed of geometric features having various colors to apply to an object, the micro marker comprising:
    a background having a first color;
    multiple localization features formed on the background having a second color; and
    multiple information encoding features, each information encoding feature having a color selected from multiple colors to represent digital values, the information encoding features being arranged proximate the localization features on the background.

2. The micro marker of example 1 wherein the localization features comprise two spaced apart geometric features, with the multiple information encoding features positioned between the two spaced apart geometric features.

3. The micro marker of example 2 wherein the localization features encode the start and end of the information encoding features based on the shape and color of localization features.

4. The micro marker of any of examples 1-2 wherein the information encoding features comprise quadrilaterals.

5. The micro marker of example 4 wherein the quadrilaterals have colors that represent digital values.

6. The micro marker of example 5 wherein the quadrilateral colors are selected from combinations of three or four different colors.

7. The micro marker of example 5 wherein the quadrilateral colors are selected from combinations of yellow, magenta, and blue.

8. The micro marker of example 5 wherein the quadrilaterals are arranged centered on a line between centers of the localization features and are equally spaced apart.

9. The micro marker of example 8 wherein the localization features have a relative length of one 1.0 units and wherein the quadrilaterals have a relative length of 0.75 units and are separated from the localization features by 1.5 units, and wherein the localization features and quadrilaterals have a relative height of one 1.0 unit.

10. The micro marker of example 9 wherein the quadrilaterals are separated from each other by a constant margin.

11. A method comprising:
    obtaining an image of an object having a micro marker on the object visible in the image;
    identifying localization features of the micro marker; and
    obtaining information from the information encoding features between a pair of the localization features.

12. The method of example 11 wherein identifying localization features includes recognizing a background of the micro marker and recognizing the localization feature shape and colors on either side of the information encoding features.

13. The method of any of examples 11-12 and further comprising:
    recognizing a portion of the object utilizing image analyses; and
    identifying the micro marker as a function of the recognized portion of the object.

14. The method of any of examples 11-13 wherein the localization features include localization feature shapes having a selected color, and
    wherein the information encoding features are quadrilaterals, each having a color selected from multiple colors to represent digital values, the information encoding features being arranged between the pair of reference features on the background.

15. The method of any of examples 11-14 wherein information from the information encoding features comprises:
    locating each information encoding feature between the localization features;
    decoding bit values per encoding feature from red, green and blue channels and
    combining the bit values from each encoding feature.

16. The method of example 15 wherein localization features are different from each other, and wherein the method further comprises using the differences to identify an order in which to decode the information encoding features.

17. The method of any of examples 14-16 wherein the quadrilaterals are arranged centered on a line between centers of the localization features and are spaced equally apart.

18. A system having a unit to capture or input an image and a processor to perform a method, the method comprising:
    determining a location of a micro marker from an image containing the micro marker based on a background of the marker and two localization features;
    identifying information encoding quadrilaterals centered on a center line between the two localization features;
    obtaining color information from each of the information encoding quadrilaterals; and
    determining a digital value for the micro marker as a function of the color information.

19. The system of example 18 wherein obtaining color information from each of the information encoding quadrilaterals comprises:
  locating each information encoding feature between a pair of the localization features;
  decoding bit values per encoding feature from red, green and blue channels and
  combining the bit values from each encoding feature.

20. The system of example 19 wherein determining a location of the micro marker includes identifying an object in the image proximate the micro marker and using the location of the identified object to determine a likely location of the micro marker.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A marker formed of geometric features having various colors to apply to an object, the marker comprising:
  a background having a first color;
  multiple localization features formed on the background having a second color wherein the multiple localization features comprise two spaced apart geometric features susceptible to decoding by a reader having a processor and a low-resolution camera; and
  multiple information encoding features, each information encoding feature having a color selected as a combination of multiple colors to represent digital values, the information encoding features being arranged proximate the localization features on the background.

2. The marker of claim 1 wherein the multiple information encoding features are positioned between the two spaced apart geometric features.

3. The marker of claim 2 wherein the localization features encode the start and end of the information encoding features based on the shape and color of localization features.

4. The marker of claim 1 wherein the information encoding features comprise quadrilaterals.

5. The marker of claim 4 wherein the quadrilateral colors are selected from combinations of three or four different colors.

6. The marker of claim 4 wherein the quadrilateral colors are selected from combinations of yellow, magenta, and blue.

7. The marker of claim 4 wherein the quadrilaterals are arranged centered on a line between centers of the localization features and are equally spaced apart.

8. The marker of claim 7 wherein the localization features have a relative length of one 1.0 units and wherein the quadrilaterals have a relative length of 0.75 units and are separated from the localization features by 1.5 units, and wherein the localization features and quadrilaterals have a relative height of one 1.0 unit.

9. The marker of claim 8 wherein the quadrilaterals are separated from each other by a constant margin.

10. A method comprising:
  obtaining an image of an object having a marker on the object visible in the image;
  recognizing a portion of the object using image analyses, wherein the portion of the object is larger than the marker;
  selecting a plurality of pixels within the image where the marker is not likely to be located;
  eliminating the plurality of pixels within the image to create a reduced pixel image;
  identifying localization features of the marker within the reduced pixel image; and
  obtaining information from the information encoding features between a pair of the localization features.

11. The method of claim 10 wherein identifying localization features includes recognizing a background of the marker and recognizing the localization feature shape and colors on either side of the information encoding features.

12. The method of claim 10 wherein the localization features include localization feature shapes having a selected color, and wherein the information encoding features are quadrilaterals, each having a color selected as a combination of multiple colors to represent digital values, the information encoding features being arranged between the pair of reference features on the background.

13. The method of claim 12 wherein the quadrilaterals are arranged centered on a line between centers of the localization features and are spaced equally apart.

14. The method of claim 10 wherein information from the information encoding features comprises:
  locating each information encoding feature between the localization features;
  decoding bit values per encoding feature from red, green and blue channels and
  combining the bit values from each encoding feature.

15. The method of claim 14 wherein localization features are different from each other, and wherein the method further comprises using the differences to identify an order in which to decode the information encoding features.

16. The method of claim 10 wherein the portion of the object is a face.

17. A system having a unit to capture or input an image and a processor to perform a method, the method comprising:
  identifying an object in an image;
  determining a likely location of a marker as a function of the identified object;
  determining a location of the marker based on the likely location of the marker, a background of the marker, and two localization features;
  identifying information encoding quadrilaterals centered on a center line between the two localization features;
  obtaining color information from each of the information encoding quadrilaterals; and
  determining a digital value for the micro marker as a function of the color information.

18. The system of claim 17 wherein obtaining color information from each of the information encoding quadrilaterals comprises:
  locating each information encoding feature between a pair of the localization features;
  decoding bit values per encoding feature from red, green and blue channels and
  combining the bit values from each encoding feature.

19. The system of claim 17 wherein the object is a face.

* * * * *